Patented July 6, 1937

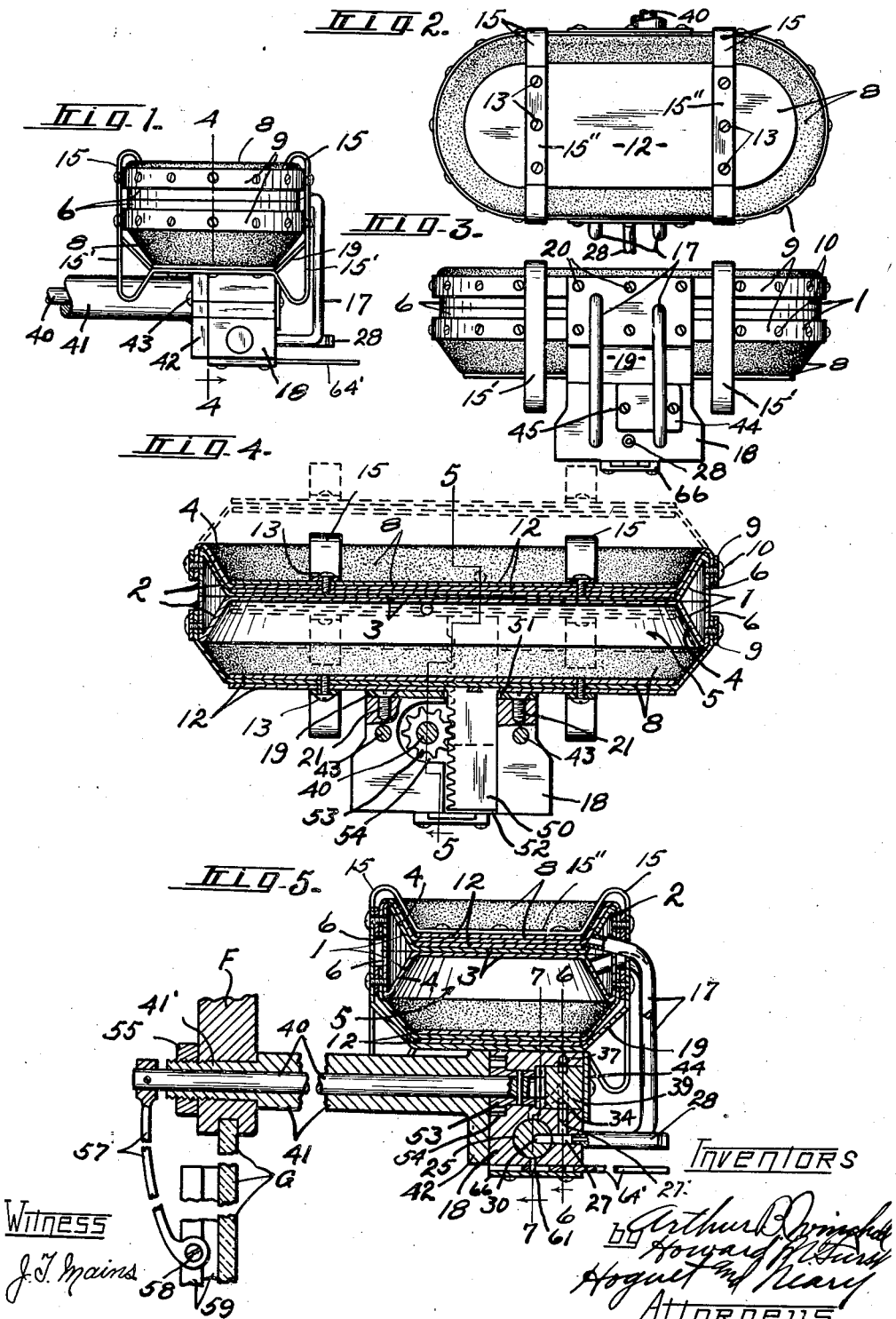

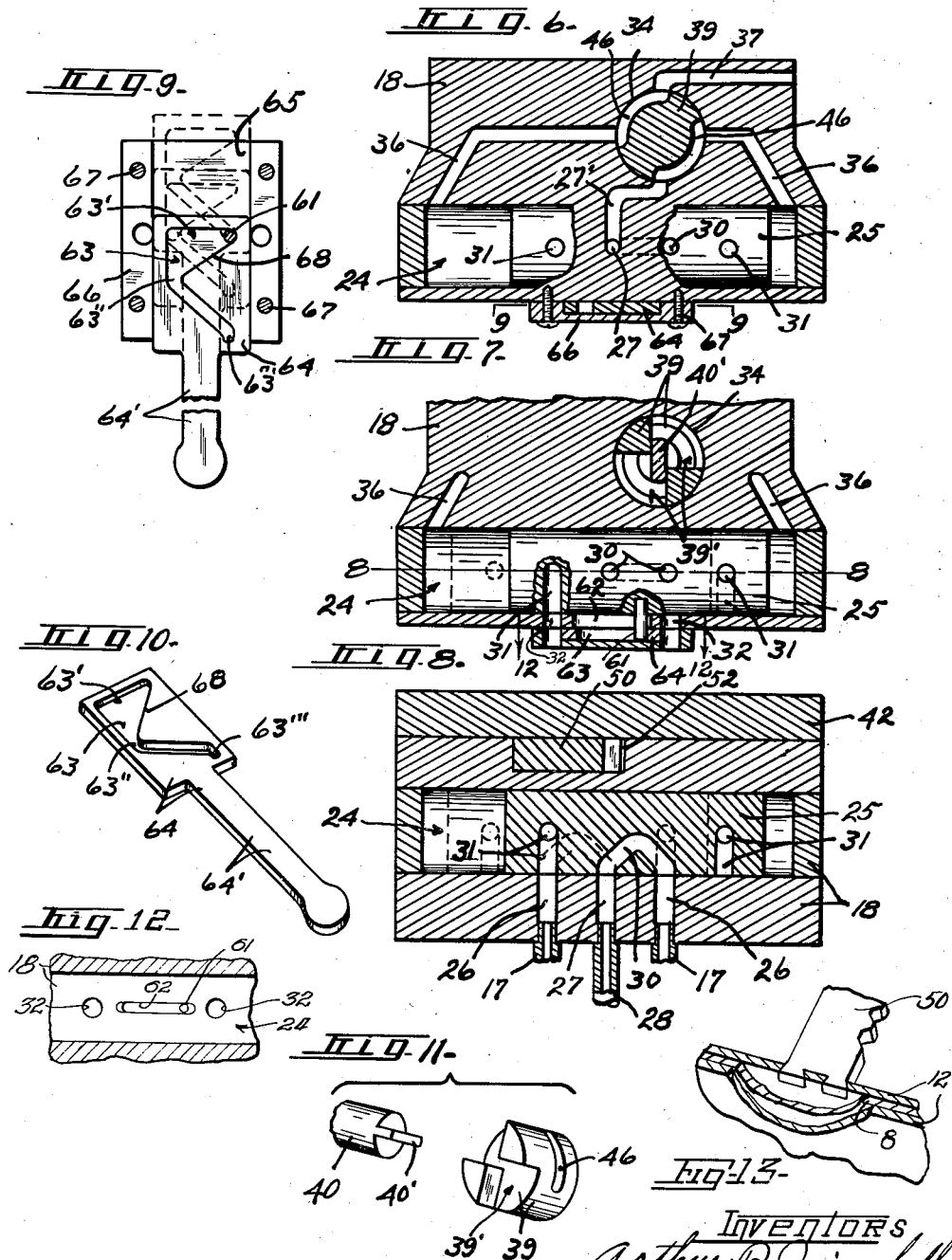

2,086,250

UNITED STATES PATENT OFFICE 2,086,250

WINDSHIELD CLEANER MOTOR

Arthur B. Winchell, Jackson, Mich., and Howard N. Furst, Syracuse, N. Y., assignors to The Sparks-Withington Company, Jackson, Mich., a corporation of Ohio Application May 12, 1934, Serial No. 725,322

10 Claims. (Cl. 121—48)

This invention relates to a windshield cleaner of the fluid pressure type, comprising a wiper arm assembly having a cleaner element adapted to be moved across a windshield glass in wiping engagement therewith to clean the same, a small fluid pressure motor adapted to be operated by differential fluid pressure produced by utilizing the suction created in the intake manifold of the engine for operating the vehicle or other suitable vacuum producing means and a simply constructed automatic valve mechanism for controlling the action of the vacuum in the cleaner motor.

The primary objects of this invention are to produce a windshield cleaner motor of the above mentioned type which is simple, economical and durable in construction, and which is strong, positive and efficient in operation.

A more specific object of the invention resides in providing a novelly constructed motor adapted to be operated by differential fluid pressure wherein the leakage of the operating fluid in the pressure chambers is substantially entirely eliminated, thereby producing a motor which is particularly adapted for long continuous service.

Another object of the invention is to provide an automatic valve mechanism for controlling the action of the suction or partial vacuum in the motor which is simple in construction and operation.

Other objects and advantages pertaining to the construction and to the form and relation of the parts thereof will more fully appear from the following description taken in connection with the accompanying drawings, in which:

Figure 1 is an end view of a windshield cleaner motor embodying the various features of this invention, in which a portion of the wiper shaft and housing therefor is broken away.

Figure 2 is a top plan view of the device illustrated in Figure 1.

Figure 3 is a side elevation of the device shown in Figure 1.

Figure 4 is an enlarged vertical sectional view taken substantially in the plane of the line 4—4, Figure 1.

Figure 5 is a transverse vertical sectional view taken substantially in the plane of the line 5—5, Figure 4, illustrating the windshield cleaner mounted adjacent a windshield with portions of the windshield wiper shaft, the wiper arm assembly, and the windshield glass broken away.

Figure 6 is an enlarged detail vertical sectional view taken through the valve block substantially on line 6—6, Figure 5.

Figure 7 is an enlarged detail vertical sectional view through the valve block taken in the plane of the line 7—7, Figure 5.

Figure 8 is a horizontal sectional view taken on line 8—8, Figure 7.

Figure 9 is a detail horizontal sectional view taken on line 9—9, Figure 6, illustrating the control plate in elevation.

Figure 10 is a perspective view of the control plate.

Figure 11 is a perspective view of the auxiliary control valve and the adjacent end of the wiper shaft.

Figure 12 is an enlarged fragmentary horizontal sectional view through the valve block taken substantially on line 12—12, Figure 7 and illustrating the arrangement of the exhaust ports and pin and slot members provided at the lower portion of the control valve chamber for controlling the operation of the control valve.

Figure 13 is a fragmentary perspective view partly in section illustrating the manner of securing the operating rack member and one of the diaphragms to each other.

The device as illustrated in the drawings comprises a diaphragm support 1, composed of two complemental recessed sections 2, formed in this instance of sheet metal stampings. Each of the sections 2 is oblong in plane view and comprises a bottom wall 3 and outwardly flaring or tapered sidewalls 4, which define an oblong recess or chamber 5. The outer edge portion of the side wall 4 of each section terminates in a reverse bent portion which forms a marginal flange 6, having an axial length substantially equal to that of the side wall and which extends in a plane normal to the bottom wall 3.

The sections 2 of the diaphragm supporting member 1 are arranged reversely and are secured together with their bottom walls in contiguous relation by any suitable means as by spot welding so that the recesses 5 are arranged in the outer surfaces of the member 1. Each section 2 is provided with a flexible diaphragm 8 which extends across the recess thereof and is composed of fabric or other suitable material treated by rubber or the like to render the same impervious to air and moisture. Each diaphragm 8 is secured at the marginal edge thereof to a respective section 2 by a band member 9, surrounding the marginal flange portion 6, and by screws or bolts 10 which pass through registering openings in the band member and diaphragm and are screw threaded in the flange member 6. Each of the diaphragms 8 is provided with a pair of reinforcing plates 12, positioned one at either side of the central portion of the diaphragm. These plates 12 are oblong in plane view, that is, they conform in general outline and area to the inner surface of the bottom walls 3 so that when the diaphragms are in their innermost positions, the inner positioned plate will lie in close proximity to the bottom wall and thereby provide each diaphragm with a maximum effective pressure surface.

Plates 12 of each diaphragm are secured together and to the diaphragm by any suitable means such as screws 13 which pass through registering holes in one of the plates and the diaphragm, and are screw threaded in the other plate. The diaphragms 8 are connected to each other so as to transmit motion from one to the other, by means of a plurality of, in this instance two, tie straps 15, composed of sheet metal or the like. These tie straps each consist of a pair of vertical side portions 15' adapted to receive the diaphragms and diaphragm supporting member therebetween, and are so spaced apart that the straps may move vertically during the flexing of the diaphragms without coming into contact with the supporting member 1. The ends of the side portions 15' are connected by transverse end portions which have intermediate inwardly positioned portions 15" adapted to contact with the outer positioned diaphragm plate 12 of the respective diaphragm when the diaphragms are in their innermost position within the recesses 5. The straps 15 are secured in any suitable manner to the diaphragms as by the screws 13 which pass through suitable apertures provided in the strap portions 15".

It will now be readily understood that we have provided a novel fluid pressure motor comprising a pair of spaced fluid pressure chambers formed by the recesses 5, at opposite sides of the diaphragm supporting member 1. The chambers 5 are each provided with a flexible side wall comprising the diaphragms 8 adapted to vibrate from a position within the frame recess or chamber 5 to a corresponding position outside the recess by differential fluid pressure and without excessive flexing of any portion of the diaphragm. This differential pressure is effected by atmospheric pressure constantly present on the outside of the diaphragms and a partial vacuum produced alternately in the recesses 5 at the inside of the diaphragms. This partial vacuum in the chambers 5 may be produced from any suitable source of suction such as a vacuum pump operated by the vehicle engine or any other suitable moving member of the vehicle not shown, or the suction created in the intake manifold of the vehicle motor may be utilized in any conventional manner.

In order that the chambers 5 may be operatively connected with a source of vacuum, each section 2 has one end of a conduit 17 connected to the side wall 4 thereof adjacent the corresponding bottom wall 3. These conduits 17 extend outwardly through an aperture provided in a respective flange portion 6 and have the other end thereof connected with a valve block 18, in longitudinal spaced relation near the lower portion thereof. The valve block 18 is connected with the diaphragm support 1 by means of a U shaped bracket 19 having the end portion of each leg thereof secured to the flange portion 6 of each section 2 at either side of the supporting member 1 by screws 20. The transverse portion of the bracket is arranged beneath the diaphragm support 1 out of the path of movement of the lowermost diaphragm 8 and has the valve block 18 secured thereto by means of screws 21, see Figure 4.

The valve block 18 is provided with a valve chamber 24 which extends longitudinally thereof and in which is reciprocally mounted a main supply valve 25. The ends of the conduit 17 are maintained in communication with the valve chamber 24 by a pair of fluid passages 26 provided in the valve block 18 and which communicate with said chamber at substantially equal distances either side of the longitudinal center thereof. A suction passage 27 is also provided in the valve block 18 which communicates at one end with the valve chamber 24 substantially midway between the passages 26. A suction conduit 28 is mounted at one end in the valve block 18 in communication with the suction passage 27, said conduit being adapted to be connected by any suitable means, such as a flexible conduit, not shown, with a source of suction.

The main supply valve 25 in this instance, is a cylindrical member having a close operating fit in the chamber 24, and is provided substantially midway between the ends thereof with a return-bend duct 30, which is adapted to alternately connect the passages 26 with the suction passage 27 as the valve is reciprocated in the valve chamber 24. The valve 25 is also provided with a pair of right angled ducts 31 arranged one at either side of the return-bend duct 30 and adapted, when the valve is at one end of its stroke near one end of the chamber 24, to bring the passage 26 adjacent the opposite end of the valve into communication with one of a pair of exhaust ports 32 provided in the wall of the valve block 18 beneath the valve chamber 24.

The valve block 18 is also provided with an auxiliary valve chamber 34 arranged above the valve chamber 24 in a plane extending at right angles to said latter chamber. This valve chamber 34 is maintained in communication with the vacuum passage 27 by means of a branch passage 27' which extends upwardly through the valve block from the suction passage 27 and communicates with the valve chamber 34 at the lower side thereof. The valve block 18 is also provided with a pair of fluid passages 36 which extend outwardly from diametrically opposite sides of the auxiliary valve chamber 34 and each has an end thereof in communication with a respective end of the main supply valve chamber 24 as illustrated in Figure 6.

An exhaust port 37 is provided in the valve block 18 above the auxiliary valve chamber 34. This passage 37 has one end communicating with the auxiliary valve chamber 34 in the plane and at the diametrical opposite side from the vacuum passage 27', while the other end of the passage 37 opens through the side wall of the valve block to the atmosphere. In the valve chamber 34 is rotatably mounted an auxiliary valve 39 which is in coaxial alinement with the wiper shaft 40, which has one end positioned in the valve chamber and extends outwardly therefrom through a supporting sleeve 41, said sleeve having one end thereof flanged as at 42, and is secured to the valve block 18 by means of screws or bolts 43 passing through suitable apertures provided in said flange member 42 and screw threaded in the adjacent portion of the block 18.

The auxiliary valve 39 is maintained in the auxiliary valve chamber 34 adjacent the inner end of the wiper shaft 40 by means of a cover plate 44 which is removably secured to the block 18 by screws 45. The auxiliary valve 39 is provided with diametrically disposed peripheral elongated slots or ports 46 adapted to alternately connect the passages 36 with the suction passage 27' and with the exhaust port 37.

The auxiliary valve 39 is connected with the wiper shaft 40 to be intermittently rotated thereby by means of an inwardly projecting diametrically disposed tongue member 40' provided on the inner end of the wiper shaft 40 and which is adapted to engage in a diametrically disposed slot 39' formed in the inner end surface of the valve 39. The relation of the tongue 40' and slot 39' is such that as the wiper shaft 40 approaches the end of each rotary movement the tongue 40' will engage the side walls of the slot 39' and rotate the valve 39 sufficiently to cut off one of the passages 36 from the exhaust port 37 and to bring the same into communication with the suction passage 27' and at the same time cut off the other passage 36 from the suction passage 27' and bring the same passage into communication with the exhaust port 37.

In order that the wiper shaft 40 may be oscillated by the flexing of the diaphragms 8, we have provided the lower positioned diaphragm with a rack member 50 which has one end thereof riveted or otherwise secured to the outer positioned reinforcing plate 12 secured to the lower diaphragm 8. This rack 50 extends downwardly from the lower positioned diaphragm 8 through aligned slots 51 and 52 provided in the transverse portion of the bracket 19 and valve block 18 respectively. The rack member 50 is in meshing engagement with a pinion 53 positioned in a suitable recess 54 provided in the valve block 18 adjacent the inner face of the sleeve 41 in coaxial alinement with the auxiliary valve chamber 34. This pinion 53 is secured by any suitable means to the inner end of the wiper shaft 40 for transmitting motion thereto.

In order that the diaphragm supporting member 1 and valve block 18 may be secured in operative position adjacent a windshield, we have illustrated the outer or free end of the wiper shaft sleeve 41 as being provided with a reduced threaded end portion 41' adapted to extend through a suitable opening provided in the windshield frame F and which may be clamped to said frame by means of a nut 55 screw threaded on the outer end of the shaft and cooperating with the shoulder provided at the inner end of said reduced portion 41' of said sleeve. The wiper shaft 40 extends outwardly beyond the sleeve 41 and has secured thereto a wiper arm assembly comprising a wiper arm 57, having one end operatively connected with the wiper shaft 40 to be oscillated thereby. The other end of the arm 57 is connected by any suitable means as by the screw 58 to a wiper blade 59. The wiper arm 57 and blade 59 may be urged inwardly towards the windshield glass as G by any suitable means as by a spring element not shown interposed between the wiper arm 57 and the shaft 40, or the wiper arm 57 may itself be a spring member having the lower or free end thereof tensioned toward the windshield glass.

It will now be observed that the wiper blade 59 will be oscillated through a predetermined wiping zone across the face of the glass G during the vibration of the diaphragms 8, as said diaphragms are alternately placed at one side thereof in communication with a source of fluid operating pressure, through the medium of the rack 50, pinion 53 and the wiper shaft 40.

It will also be now clearly understood that the means for automatically placing the diaphragms at one side thereof in communication with the fluid operating pressure is effected through the medium of the main supply valve 25 which in turn is reciprocated in the valve chamber 24 by the fluid operating pressure for operating the diaphragms 8 as determined by the auxiliary valve 39. In other words, as the ends of the main supply valve 25 are brought under the influence of vacuum and atmospheric pressures, the valve will be reciprocated thereby from a position near one end of the valve chamber 24 to a similar position adjacent the other end thereof, so that the passages 26 and conduit 17 and, therefore, the pressure chambers 5 associated therewith will be alternately brought into communication with the suction passage 27 and conduit 28 through the medium of the return-bend duct 30 and with the exhaust ports 32 through the medium of the right angle duct 31.

This longitudinal reciprocating movement of the main supply valve 25 in the chamber 24 is limited by means of a pin 61 secured in the lower portion of the valve 25 and which extends downwardly through an elongated slot 62 provided in the lower wall of the chamber 24 into a cam recess 63, provided in a cam plate 64. The cam plate 64 is mounted in a horizontally disposed channel 65 provided in the upper surface of a supporting member 66 which is secured to the lower end of the valve block 18 as by screws 67. The length of the slot 62 is greater than the axial movement of the valve 25 to permit the free movement thereof while the width of the slot is substantially equal to the diameter of the pin 61 as shown in Figure 12 for coacting with said pin to prevent rotation of the valve 25 in the chamber 24.

The cam recess 63 is provided with an elongated base portion 63' at the inner end of the recess, which extends transversely of the plate 63 in parallel relation with the direction of movement of the supply valve 25 and pin 61. The length of this base portion 63' of the cam recess is such that when the pin 61 is at either end thereof, the valve 25 will be maintained thereby in such a position in the valve chamber 24 that the return bend duct 30 will maintain the suction passage 27 in communication with the passage 26 positioned in the corresponding end of the valve chamber, while the other passage 26 will be maintained in communication by the corresponding angle duct 31 with the exhaust port 32.

The cam recess 63 is further formed with a narrow passage as at 63'', intermediate its ends in longitudinal alinement with one end of the base portion 63' and is connected with the other end of said base portion by cam surface as defined by a wall 68 extending transversely of the plate 64. The cam recess extends outwardly from the portion 63'' transversely of the plate 64 and at an angle thereto to the opposite side of the plate where it terminates in a relatively short portion 63''' extending longitudinally of the plate in line with the corresponding end of the base portion 63'. The cam plate 64 is provided with a reduced outwardly extending handle portion 64' which extends beyond one side of the valve block 18 and by which said plate may be manually reciprocated in the channel 65.

It will now be understood that when the cam plate 64 is in its outermost position as shown in full lines in Figure 9, the pin will travel through the base portion 63′ of the recess 63 and that the control valve is thereby free to reciprocate in the valve chamber 24 from one end of its movement to the other, as defined by the length of the base portion 63′. When it is desired to stop the operation of the windshield cleaner motor this may be readily accomplished by manually moving the cam plate 64 inwardly until the portion 63″ of the cam recess is brought into the path of movement of the pin 61, at which position of the cam plate the valve 25 will be maintained at the corresponding end of the valve chamber 24 against the action of the suction produced in the opposite end of the valve chamber.

When the main supply valve 24 is thus maintained at one end of the valve chamber, one of the pressure chambers 5 as the uppermost chamber, will be continuously maintained in communication with the vacuum passage 27 through the medium of the return-bend duct 30 and the respective conduit 17 and passage 26 so that the diaphragm of said air chamber will be maintained in its innermost position with the result that the cleaner element or blade 59 will be maintained at one side of the wiping zone out of the line of vision.

If, however, it is desired that the windshield cleaner element 59 be maintained at the opposite side of the wiping zone when the windshield cleaner mechanism is rendered inoperative, it is only necessary to move the cam plate 64 inwardly until the end of the pin 61 registers in the portion 63‴ of the cam recess, at which position of the pin the control valve 25 will be maintained at the opposite end of the valve chamber 24 and the corresponding or lowermost diaphragm 8 will be maintained in its innermost position due to the corresponding pressure chamber 5 being constantly maintained in communication with the vacuum passage 27 through medium of the return-bend duct 30. It will now be observed that when the suction conduit 28 is connected with a suitable source of vacuum and with the valve and diaphragm mechanism positioned as illustrated in the drawings, that is, with the diaphragms in the lowermost positions, the control valve 25 in the right hand positioned as illustrated in Figures 6, 7 and 8, and the auxiliary control valve 39 arranged to maintain the right hand end of the valve chamber 24 in communication with the suction passage 27 and the right hand end of said valve chamber 24 in communication with the exhaust port 37, the wiper blade will be at one side of the wiping zone, the upper pressure chamber 5 will be in communication with atmosphere through the medium of the conduit 17, right angle duct 31, and exhaust port 32, while the lowermost pressure chamber 5 will be maintained in communication with the source of suction through the medium of the respective conduit 17, return-bend duct 30, and suction passage 27. It will thus be noted that the upper diaphragm will be maintained with equal pressures at opposite sides thereof, while the lower diaphragm will be under the influence of unequal pressure with the greater or atmospheric pressure at the outside thereof tending to force the diaphragm upwardly into the corresponding chamber 5. As the lower diaphragm is thereby moved upwardly by the differential pressure, the upper diaphragm will also be moved upwardly by the action of the lower diaphragm through the medium of the tie straps 15. As the diaphragms are thus moved upwardly, the wiper shaft will be actuated through the medium of the rack 50 and pinion 53 to move the wiper element 59 through the wiping zone from one side thereof to the other. As the wiper element 59 and shaft 40 approach the end of their movement, the auxiliary valve 39 will be engaged by the tongue 40′ of the wiper shaft and rotated thereby in the valve chamber 34 sufficiently to reverse the connections of the ends of the main valve chamber 24 with the suction passage 27 and exhaust port 37 to effect the longitudinal movement of the main control valve 24 to the other extreme position at the opposite end of the valve chamber.

As the main control valve 25 approaches the limit of its movement at the other end of its valve chamber, the upper positioned pressure chamber 5 will be cut off from the exhaust port 32 and atmospheric pressure and will be brought into communication with the source of suction while the lower positioned pressure chamber 5 will be cut off from the source of suction and be brought into communication with the atmosphere, whereupon, the diaphragms 8 will be moved downwardly to their lowermost positions which will cause the wiper element 59 to again travel through the wiping zone from one side thereof to the other and as said wiper element approaches the limit of its movement, the wiper shaft 40 will again engage the auxiliary valve 39 and rotate it sufficiently to again reverse the order of differential pressure upon the ends of the main control valve 25, for again reversing the operation of the diaphragms. These cycles of movement of the diaphragms, main supply valve 25, auxiliary valve 31 and the wiper shaft 40 and wiper arm assembly may continue as long as the suction conduit 28 is in communication with a source of vacuum. When it is desired to discontinue the operation of the windshield cleaner, it is only necessary to move the cam plate 64 inwardly until the recess portion 63″ or the portion 63‴ is brought into registration with the path of movement of the pin 61, whereupon the main control valve 25 will be maintained at the corresponding end of the valve chamber 24, and the diaphragms and mechanism operated thereby will be maintained inactive in the manner hereinbefore described.

Although we have shown and particularly described the preferred embodiment of our invention, we do not wish to be limited to the exact construction shown as various changes both in form and relation of the parts thereof may readily be made without departing from the spirit of the invention as set forth in the appended claims.

We claim:

1. In a windshield cleaner for motor vehicles, supporting means adapted to be secured to the vehicle body adjacent the windshield, a pair of diaphragm supporting elements connected to the supporting means, flexible diaphragms connected with the supporting elements to form separate fluid-tight vacuum chambers at one side of the diaphrgams, the opposite side of each diaphragm being permanently exposed to atmospheric pressure, means mounted exteriorly of the vacuum chambers and rigidly connecting the diaphragms to cause said diaphragms to move together, a suction conduit connected to the supporting means, air passages connecting the conduit with the vacuum chambers, a valve means mounted within the supporting means for controlling the flow of fluid through the passages to alternately place the vacuum chambers in communication with said conduit whereby said diaphragms are moved in the direction of the partial vacuum, a shaft journaled in the supporting means adapted to be operatively connected with a cleaner element, and means operatively connecting the diaphragms with the shaft including a gear member secured to the shaft and a rack slidably mounted within the supporting means and operatively connected with one of the diaphragms.

2. In a windshield cleaner for motor vehicles, supporting means adapted to be secured to the vehicle body adjacent the windshield, a pair of diaphragm supporting elements connected to the supporting means, flexible diaphragms connected with the supporting elements to form separate fluid-tight vacuum chambers at one side of the diaphragms, the opposite side of each diaphragm being permanently exposed to atmospheric pressure, means mounted exteriorly of the vacuum chambers and rigidly connecting the diaphragms to cause said diaphragms to move together, a suction conduit connected to the supporting means, air passages connecting the conduit with the vacuum chambers a valve means mounted within the supporting means controlling the flow of fluid through the passages to alternately place the vacuum chambers in communication with said conduit whereby said diaphragms are moved in the direction of the partial vacuum, means for operatively connecting the diaphragms with a cleaner element including a rock shaft journaled in the supporting means, a gear member connected with the rock shaft, and a rack slidably mounted in the supporting means in meshing engagement with said gear and fixedly connected with one of the diaphragms to move in the direction of movement of the diaphragms.

3. In a windshield cleaner motor a diaphragm support comprising two complemental sections, each of which has a recess in one side thereof, means securing said sections together with the recesses in opposed spaced relation to each other, a pair of diaphragms, each of said diaphragms being secured to a respective section to extend across the recess thereof to form a fluid-tight pressure chamber, each of said diaphragms comprising an inflexible central portion adapted to move into and out of the section recess and a flexible marginal portion adapted to extend from the central portion beyond said recess into engagement with the marginal portion of said section, connecting means mounted exteriorly of the pressure chambers and secured to said central portions of the diaphragms at opposite sides of the center thereof to cause said diaphragms to move in unison, fluid conveying means including a valve mechanism for alternately connecting the chambers with a source of operating fluid pressure to produce unequal pressure in said chambers whereby the diaphragms are moved in the direction of least pressure, a drive member for operating a wiping element, and means mounted exteriorly of the pressure chambers and operatively connected with one of the diaphragms intermediate the connecting means for operatively connecting said diaphragms to the drive member.

4. In a windshield cleaner motor, a diaphragm support comprising two complemental sections composed of sheet metal stampings, each of said sections having a recess in one side thereof, means securing said sections together with the recesses thereof facing outwardly in opposite directions, a pair of diaphragms, each of which is extended across the recess of a respective section to form a fluid-tight pressure chamber, each of said diaphragms comprising an inflexible central portion adapted to move into and out of the section recess and a flexible marginal portion adapted to extend from the central portion beyond said recess into engagement with the marginal portion of said section, means engaging said marginal portion of the diaphragms for securing the same to the corresponding section, connecting means mounted exteriorly of the diaphragm supporting sections and secured to said central portions of the diaphragms at opposite sides of the center thereof to cause said diaphragms to move in unison, fluid conveying means including a valve mechanism for alternately connecting the chambers with a source of operating fluid pressure to produce unequal pressures in said chambers whereby the diaphragms are moved in the direction of least pressure, a drive shaft for operating a wiping element rotatably mounted adjacent the diaphragm support, and means mounted exteriorly of the pressure chambers and fixedly secured to one of the diaphragms intermediate the connecting means for operatively connecting said diaphragms to said shaft.

5. In a windshield cleaner for motor driven vehicles having a source of suction, a motor for moving the cleaner element through a predetermined path of movement on a surface of a windshield glass comprising a diaphragm support, a valve support, means for securing said supports together and to the vehicle, a pair of diaphragms secured to the former support exteriorly thereof to form spaced fluid-tight pressure chambers, a drive shaft for the wiper element mounted exteriorly of the pressure chambers, means mounted exteriorly of the pressure chambers connecting the diaphragms to each other to cause said diaphragms to move in unison, means connected with one of said diaphragms independently of the diaphragm connecting means for operatively connecting the diaphragms with the shaft, and fluid conveying means including an automatic valve mechanism mounted in said latter support exteriorly of the pressure chambers for alternately connecting the pressure chambers with a source of operating fluid pressure whereby the diaphragms are operated by differential fluid pressure, said valve mechanism including a reciprocating main supply control valve actuated by differential fluid pressure and an oscillatably mounted auxiliary control valve for alternately connecting opposite ends of the main supply valve with the source of operating fluid pressure and with the atmosphere, and mechanical drive means operatively connecting the auxiliary control valve with the drive shaft.

6. In a windshield cleaner for motor driven vehicles having a source of operating fluid pressure, a motor for moving the wiper element through a predetermined path of movement on a surface of a windshield glass comprising a diaphragm support, a valve support, means securing said supports together and to the vehicle, a pair of diaphragms secured to the former support exteriorly thereof to form spaced fluid-tight pressure chambers, mechanical drive means mounted exteriorly of the pressure chambers for operatively connecting the diaphragms with the wiper element including a drive shaft and means connected with both diaphragms and with the shaft whereby the movement of the diaphragms relative to said support will actuate said shaft, fluid conveying means including an automatic valve mechanism mounted in the latter support exteriorly of the pressure chambers for alternately connecting the pressure chambers with the source of operating fluid pressure whereby the diaphragms are operated by differential fluid pressure, said valve mechanism including a reciprocating main supply control valve actuated by differential fluid pressure, an oscillatably mounted auxiliary control valve for alternately connecting opposite ends of the main supply valve with the source of operating fluid pressure and with the atmosphere, and drive means operatively connecting the auxiliary control valve with the mechanical drive means.

7. A device as in claim 6 having manually operated means for controlling the operation of the motor including a pin connected with one of the valves to move therewith and a control member operatively engaging said pin to alter the normal operation of the valve as produced by the operating means therefor for governing the effect of the action of said valve.

8. A device as in claim 6 having manually operated means including a pin connected with the main supply valve and an apertured slide member for engaging said pin adapted to maintain said valve in a predetermined position against the action of the differential pressure whereby the operation of the motor may be controlled.

9. In a windshield cleaner for motor vehicles, a valve casing, means connected with the casing for securing the same to the vehicle body adjacent the windshield, a shaft adapted to be operably connected with a cleaner element journaled in said means, a diaphragm support connected with the valve casing at one side thereof, a pair of flexible diaphragms connected with the diaphragm support to form spaced fluid-tight vacuum chambers at adjacent side of the diaphragms, the opposite side of each diaphragm being permanently exposed to atmospheric pressure, means mounted exteriorly of the vacuum chambers and rigidly connecting the diaphragms to each other to cause said diaphragms to move together, means including a rack operatively connected with the diaphragms and slidably mounted in the valve casing for operatively connecting the diaphragms with the shaft to rock said shaft, a suction conduit connected to the valve case, valve passages for alternately connecting the vacuum chambers with the suction conduit and with the atmosphere including a main supply control valve adapted to be actuated by differential fluid pressure, an auxiliary control valve for alternately connecting opposite ends of the main supply valve with the suction conduit and with the atmosphere, and drive means operatively connecting the shaft to the auxiliary control valve, said drive means including cooperating drive and driven elements having a lost motion therebetween during a portion only of the cycle of operation of said drive element, whereby said valve is intermittently actuated by the shaft.

10. In a fluid pressure operated motor for operating a windshield cleaner element or the like, in combination, a supporting means including a diaphragm support and a valve support arranged at one side of the diaphragm support, a pair of flexible diaphragms secured to the diaphragm support to provide separate fluid tight pressure chambers, one chamber being arranged at one side of each of the diaphragms, the opposite side of each of the diaphragms being permanently exposed to atmospheric pressure, a drive element connected with the supporting means to rotate about an axis extending substantially normal to the direction of movement of the diaphragms, means mounted exteriorly of the pressure chambers operatively connecting the drive element with the diaphragms comprising a member connected with the element to rotate therewith, a second member operatively engaging the first mentioned member and supported by the supporting means to reciprocate in the direction of movement of the diaphragms, means mounted exteriorly of the pressure chambers operatively connecting the diaphragms and said second member to each other, and fluid conveying means including an automatic valve mechanism supported by the valve support exteriorly of the pressure chambers and controlled by the operation of said second member for alternately connecting the pressure chambers with a source of fluid operating pressure and with an exhaust for said operating pressure.

ARTHUR B. WINCHELL.
HOWARD N. FURST.